(12) United States Patent
Sakai et al.

(10) Patent No.: US 11,380,921 B2
(45) Date of Patent: Jul. 5, 2022

(54) SYSTEM, METHOD OF CONTROLLING SYSTEM, AND STORAGE MEDIUM

(71) Applicant: HONDA MOTOR CO., LTD., Tokyo (JP)

(72) Inventors: Ryoji Sakai, Wako (JP); Akihiro Matsui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/031,946

(22) Filed: Sep. 25, 2020

(65) Prior Publication Data

US 2021/0104757 A1    Apr. 8, 2021

(30) Foreign Application Priority Data

Oct. 3, 2019 (JP) .............................. JP2019-182867

(51) Int. Cl.
| | |
|---|---|
| *H01M 8/04* | (2016.01) |
| *H01M 8/04858* | (2016.01) |
| *H01M 8/0432* | (2016.01) |
| *B60L 58/34* | (2019.01) |
| *B60L 58/40* | (2019.01) |
| *H01M 8/04223* | (2016.01) |

(52) U.S. Cl.
CPC ........... *H01M 8/0494* (2013.01); *B60L 58/34* (2019.02); *B60L 58/40* (2019.02); *H01M 8/0432* (2013.01); *H01M 8/04268* (2013.01); *H01M 2250/20* (2013.01)

(58) Field of Classification Search
CPC ........... H01M 8/0494; H01M 8/04268; H01M 8/0432
See application file for complete search history.

(56) References Cited

U.S. PATENT DOCUMENTS

2015/0280262 A1 * 10/2015 Hoshi ..................... B60L 58/31
429/429

FOREIGN PATENT DOCUMENTS

| JP | 2004-281219 | 10/2004 |
|---|---|---|
| JP | 2008-103228 | 5/2008 |
| JP | 2009-277502 | 11/2009 |

(Continued)

OTHER PUBLICATIONS

Japanese Office Action for Japanese Patent Application No. 2019-182867 dated May 11, 2021.

*Primary Examiner* — Olatunji A Godo
(74) *Attorney, Agent, or Firm* — Amin, Turocy & Watson, LLP

(57) ABSTRACT

A system includes an electrical storage device that stores an electric power generated by a fuel cell, an electric load to which the electric power is supplied using the electric power of the fuel cell and/or the electrical storage device, and an electric power control part that controls supply of the electric power to the electric load, and the electric power control part performs warming-up control of the fuel cell when an electric power requested to be generated at the fuel cell is less than a predetermined value, and causes the fuel cell to generate an electric power that is greater than the electric power requested to be generated at the fuel cell and causes to store excess electric power in the electrical storage device when the electric power requested to be generated at the fuel cell is equal to or greater than the predetermined value.

7 Claims, 8 Drawing Sheets

(56) References Cited

FOREIGN PATENT DOCUMENTS

| JP | 2013-243022 | 12/2013 |
|----|-------------|---------|
| JP | 2014-220156 | 11/2014 |

* cited by examiner

FIG. 3

| SOC OF BATTERY | | TEMPERATURE OF BATTERY | |
|---|---|---|---|
| | | HIGH | LOW |
| HIGH | | CONTROL 2 | CONTROL 1 |
| LOW | | CONTROL 3 | CONTROL 4 |

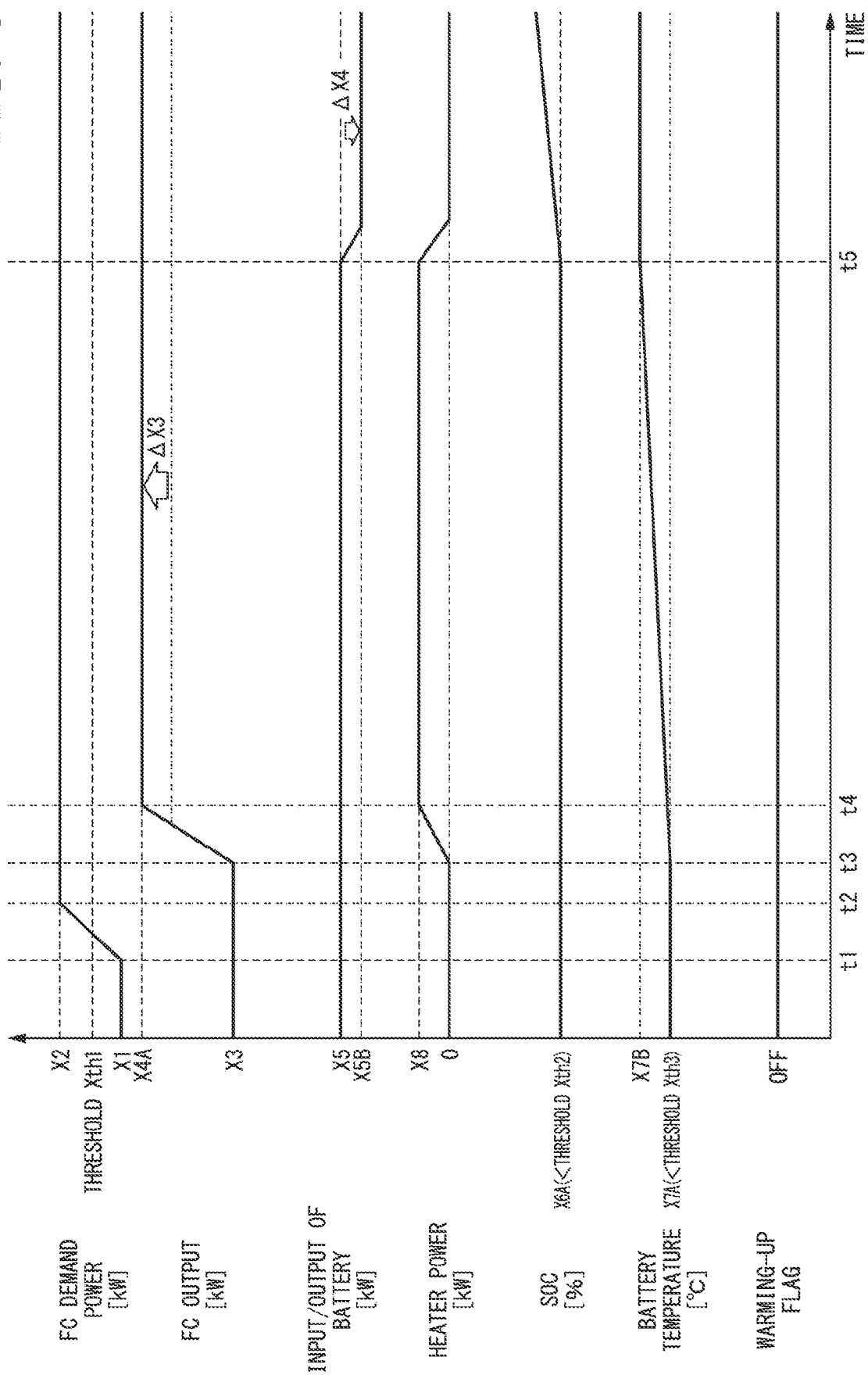

SYSTEM, METHOD OF CONTROLLING SYSTEM, AND STORAGE MEDIUM

CROSS-REFERENCE TO RELATED APPLICATION

Priority is claimed on Japanese Patent Application No. 2019-182867, filed Oct. 3, 2019, the content of which is incorporated herein by reference.

BACKGROUND OF THE INVENTION

Field of the Invention

The present invention relates to a system, a method of controlling a system, and a storage medium.

Description of Related Art

In the related art, a technology of warming up a fuel cell and a secondary battery by alternately performing first processing of controlling an electric power distribution part such that a generated electric power of the fuel cell is supplied to auxiliary machinery and a secondary battery and second processing of controlling the electric power distribution part such that electric power generated due to discharge of at least the secondary battery is supplied to at least one of the auxiliary machinery and a load, and repeating charging and discharge of the secondary battery to generate heat while generating heat by causing the fuel cell to generate electric power is known (for example, see Japanese Unexamined Patent Application, First Publication No. 2008-103228).

SUMMARY OF THE INVENTION

However, in the related art, an increase in energy efficiency when warming-up of a fuel cell has not been considered.

An aspect of the present invention is directed to providing a system, a method of controlling a system, and a storage medium that are capable of increasing energy efficiency when warming-up of a fuel cell is performed.

A system, a method of controlling a system, and a storage medium according to the present invention employ the following configurations.

(1) A system according to an aspect of the present invention includes a fuel cell configured to generate an electric power by reacting a fuel of an anode with an oxidant of a cathode; an electrical storage device configured to store an electric power generated by the fuel cell; an electric load to which the electric power is supplied using at least one of the electric power generated by the fuel cell and the electric power stored in the electrical storage device; and an electric power control part configured to control supply of the electric power from the fuel cell and the electrical storage device to the electric load, wherein the electric power control part performs warming-up control of the fuel cell when warming-up of the fuel cell is necessary and an electric power requested to be generated at the fuel cell is less than a predetermined value, and causes the fuel cell to generate an electric power that is greater than the electric power requested to be generated at the fuel cell and causes to store excess electric power in the electrical storage device when the warming-up of the fuel cell is necessary and the electric power requested to be generated at the fuel cell is equal to or greater than the predetermined value.

(2) In the aspect of the above-mentioned (1), the warming-up control may be control of generating an exothermic reaction by supplying the fuel, which is non-reacted, discharged from the anode to the cathode.

(3) In the aspect of the above-mentioned (1) or (2), the electric power control part may not perform the warming-up control of the fuel cell when the warming-up of the fuel cell is necessary and the electric power requested to be generated at the fuel cell is equal to or greater than the predetermined value.

(4) In the aspect of the above-mentioned (1) to (3), the system may further include a temperature detection part configured to detect a temperature of the electrical storage device; a charged rate detection part configured to detect a charged rate of the electrical storage device; and a heating part provided at a position where heat is transferred to the electrical storage device and configured to generate heat using an electric power, wherein the electric power control part causes the fuel cell to generate the electric power requested to be generated at the fuel cell and cause to generate heat by supplying the electric power stored in the electrical storage device to the heating part to generate heat when the electric power requested to be generated at the fuel cell is greater than the predetermined value, the temperature of the electrical storage device detected by the temperature detection part is less than the predetermined temperature, and the charged rate detected by the charged rate detection part is equal to or greater than a predetermined proportion.

(5) In the aspect of the above-mentioned (1) to (4), the system may further include a temperature detection part configured to detect a temperature of the electrical storage device; a charged rate detection part configured to detect a charged rate of the electrical storage device; and a heating part provided at a position where heat is transferred to the electrical storage device and configured to generate heat using an electric power, wherein the electric power control part causes the fuel cell to generate the electric power requested to be generated at the fuel cell and does not supply the electric power stored in the electrical storage device to the heating part when the electric power requested to be generated at the fuel cell is greater than the predetermined value, the temperature of the electrical storage device detected by the temperature detection part is equal to or greater than a predetermined temperature, and a charged rate detected by the charged rate detection part is equal to or greater than a predetermined proportion.

(6) In the aspect of the above-mentioned (1) to (5), the system may further include a temperature detection part configured to detect a temperature of the electrical storage device; a charged rate detection part configured to detect a charged rate of the electrical storage device; and a heating part provided at a position where heat is transferred to the electrical storage device and configured to generate heat using an electric power, wherein the electric power control part causes the fuel cell to generate an electric power greater than the electric power requested to be generated at the fuel cell, causes to store excess electric power in the electrical storage device, and does not supply the electric power stored in the electrical storage device including the excess electric power to the heating part when the electric power requested to be generated at the fuel cell is greater than the predetermined value, a temperature of the electrical storage device detected by the temperature detection part is equal to or greater than a predetermined temperature, and a charged rate detected by the charged rate detection part is less than a predetermined proportion.

(7) In the aspect of the above-mentioned (1) to (6), the system may further include a temperature detection part configured to detect a temperature of the electrical storage device; a charged rate detection part configured to detect a charged rate of the electrical storage device; and a heating part provided at a position where heat is transferred to the electrical storage device and configured to generate heat using an electric power, wherein the electric power control part causes the fuel cell to generate an electric power greater than the electric power requested to be generated at the fuel cell, causes to store excess electric power in the electrical storage device, and causes to generate heat by supplying an electric power stored in the electrical storage device including the excess electric power to the heating part when the electric power requested to be generated at the fuel cell is greater than the predetermined value, a temperature of the electrical storage device detected by the temperature detection part is less than a predetermined temperature, and a charged rate detected by the charged rate detection part is less than a predetermined proportion.

(8) A system according to another aspect of the present invention includes a fuel cell configured to generate an electric power by reacting fuel of an anode with oxidant of a cathode; an electrical storage device configured to store the electric power generated by the fuel cell; an electric load to which an electric power is supplied using at least one of an electric power generated by the fuel cell and an electric power stored in the electrical storage device; and an electric power control part configured to control supply of an electric power from the fuel cell and the electrical storage device to the electric load, wherein the electric power control part decreases a degree of warming-up control of the fuel cell when an electric power requested to be generated at the fuel cell is greater than a predetermined value in comparison with the case in which the electric power requested to be generated at the fuel cell is smaller than the predetermined value.

(9) A method of controlling a system according to another aspect of the present invention is performed by a control device of a system including: a fuel cell configured to generate an electric power by reacting fuel of an anode with oxidant of a cathode; an electrical storage device configured to store the electric power generated by the fuel cell; and an electric load to which an electric power is supplied using at least one of an electric power generated by the fuel cell and an electric power stored in the electrical storage device, the method including: controlling supply of an electric power from the fuel cell and the electrical storage device to the electric load; performing warming-up control of the fuel cell when warming-up of the fuel cell is necessary and an electric power requested to be generated at the fuel cell is less than a predetermined value; and causing the fuel cell to generate an electric power greater than the electric power requested to be generated at the fuel cell and causing to store excess electric power in the electrical storage device when the warming-up of the fuel cell is necessary and the electric power requested to be generated at the fuel cell is equal to or greater than the predetermined value.

A storage medium according to another aspect of the present invention, on which a program is stored, is provided, and the program is configured to cause a control computer of a system including: a fuel cell configured to generate an electric power by reacting fuel of an anode with oxidant of a cathode; an electrical storage device configured to store the electric power generated by the fuel cell; and an electric load to which an electric power is supplied using at least one of an electric power generated by the fuel cell and an electric power stored in the electrical storage device, to perform processing of controlling supply of an electric power from the fuel cell and the electrical storage device to the electric load; processing of performing warming-up control of the fuel cell when warming-up of the fuel cell is necessary and an electric power requested to be generated at the fuel cell is less than a predetermined value; and processing of causing the fuel cell to generate an electric power greater than the electric power requested to be generated at the fuel cell and storing excess electric power in the electrical storage device when the warming-up of the fuel cell is necessary and the electric power requested to be generated at the fuel cell is equal to or greater than the predetermined value.

According to the aspect of the above-mentioned (1) to (10), it is possible to increase energy efficiency when warming-up of a fuel cell is performed.

BRIEF DESCRIPTION OF THE DRAWINGS

FIG. 3 is a table showing an example of case classification of control by a temperature of a battery and an SOC of the battery.

FIG. 8 is a timing chart showing an example of a state quantity or the like in a scene in which Control 4 is executed.

DETAILED DESCRIPTION OF THE INVENTION

Hereinafter, embodiments of a fuel cell system, a method of controlling a fuel cell system, and a storage medium on which a program is stored, of the present invention will be described with reference to the accompanying drawings. In the following description, an electric vehicle 10 is a fuel cell vehicle using an electric power generated in a fuel cell as an electric power for traveling. In addition, in the following description, control devices in the fuel cell system may be realized by executing a program (software) using a hardware processor such as a central processing unit (CPU) or the like. In addition, some or all of these components may be realized by hardware (a circuit part; including circuitry) such as a large scale integration (LSI), an application specific integrated circuit (ASIC), a field programmable gate array (FPGA), a graphics processing unit (GPU), or the like, or may be realized by cooperation of software and hardware. The program may have been previously stored in a storage device such as a hard disc drive (HDD), a flash memory, or the like (a storage device including a non-transient storage medium), stored in a detachable storage medium such as a digital video disc (DVD), a compact disc read only memory (CD-ROM), or the like, or installed on a HDD or a flash memory by mounting the storage medium (non-transient storage medium) on a drive device.

[Electric Vehicle]

Figure 1:
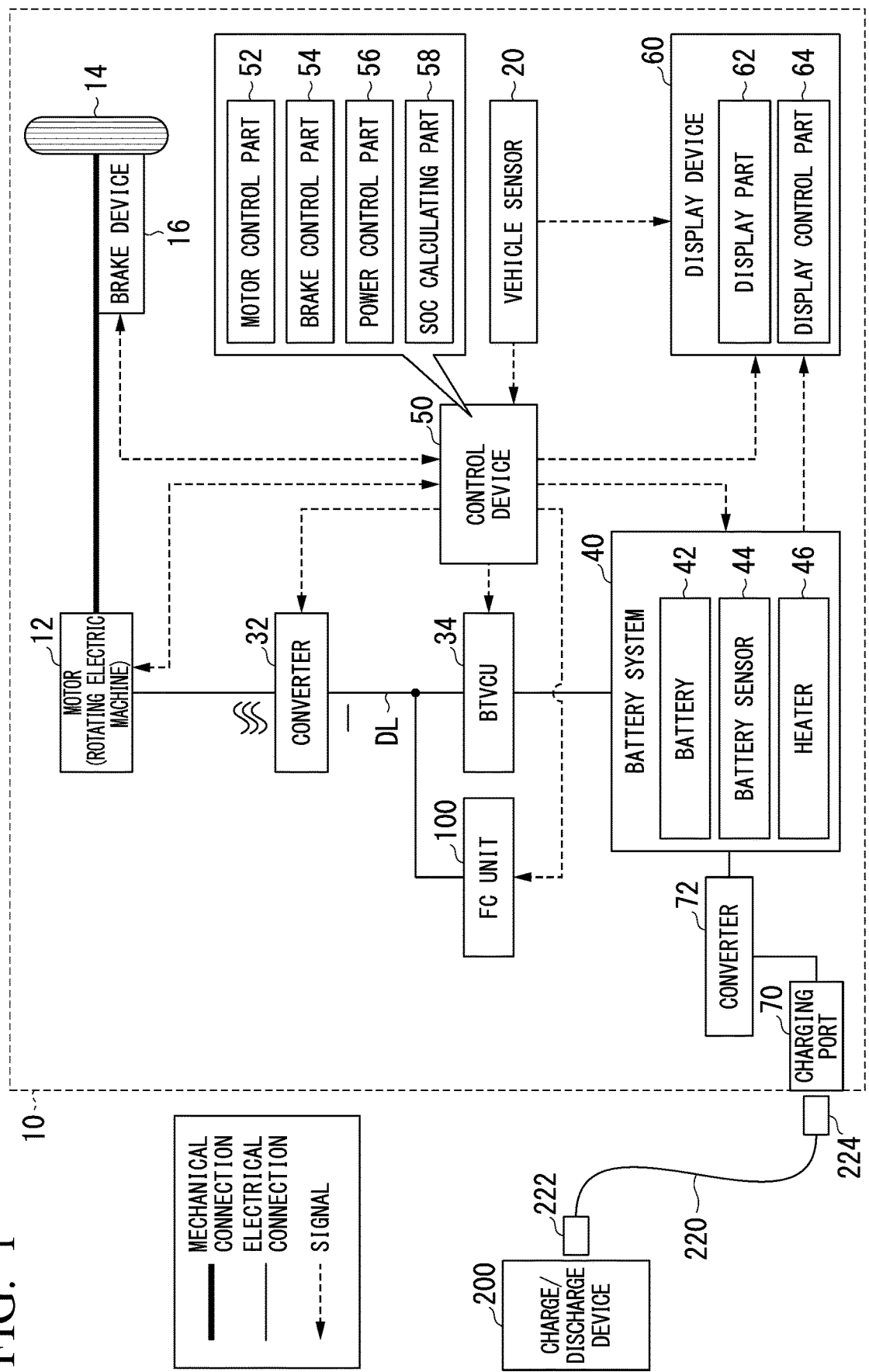
FIG. 1 is a view showing an example of a configuration of an electric vehicle according to an embodiment.

FIG. 1 is a view showing an example of a configuration of the electric vehicle 10. As shown in FIG. 1, the electric vehicle 10 includes, for example, a motor 12, driving wheels 14, a brake device 16, a vehicle sensor 20, a converter 32, a battery voltage control unit (BTVCU) 34, a battery system (an electrical storage device) 40, a control device 50, a display device 60, a charging port 70, a converter 72 and a fuel cell (FC) system 100. A combination of the control device 50 and the FC system 100 is an example of a fuel cell system. The motor 12 is an example of an electric load.

The motor 12 is, for example, a three-phase alternating current motor. A rotor of the motor 12 is connected to the driving wheels 14. The motor 12 outputs a driving force used for traveling of the electric vehicle 10 to the driving wheels 14 using at least one of an electric power generated by the FC system 100 and an electric power stored by the battery system 40. In addition, the motor 12 generates electric power using kinetic energy of the vehicle upon deceleration of the vehicle.

The brake device 16 includes, for example, a brake caliper, a cylinder configured to transmit a hydraulic pressure to the brake caliper, and an electric motor configured to generate a hydraulic pressure in the cylinder. The brake device 16 may include a mechanism configured to transmit a hydraulic pressure generated by an operation of a brake pedal to the cylinder via a master cylinder as a backup. Further, the brake device 16 is not limited to the above-mentioned configuration and may be an electronically-controlled hydraulic brake device configured to transmit a hydraulic pressure of the master cylinder to the cylinder.

The vehicle sensor 20 includes an accelerator opening sensor, a vehicle speed sensor and a brake depression amount sensor. The accelerator opening sensor is attached to an accelerator pedal that is an example of an operator configured to receive an acceleration instruction by a driver, detects an operation amount of an accelerator pedal, and outputs the operation amount to the control device 50 as an accelerator opening degree. The vehicle speed sensor includes, for example, wheel speed sensors and a speed calculator attached to each wheels, combines the wheel speeds detected by the wheel speed sensors to derive a speed of the vehicle (a vehicle speed), and outputs the vehicle speed to the control device 50 and the display device 60. The brake depression amount sensor is attached to a brake pedal, detects an operation amount of the brake pedal, and outputs the operation amount to the control device 50 as a brake depression amount.

The converter 32 is, for example, an AC-DC converter. A DC-side terminal of the converter 32 is connected to a DC link DL. The battery system 40 is connected to the DC link DL via the BTVCU 34. The converter 32 converts an AC voltage generated by the motor 12 into a DC voltage and outputs the converted AC voltage to the DC link DL.

The BTVCU 34 is, for example, a boosting type DC-DC converter. The BTVCU 34 boosts the DC voltage supplied from the battery system 40 and outputs the boosted DV voltage to the DC link DL. In addition, the BTVCU 34 outputs a regenerative voltage supplied from the motor 12 or a FC voltage supplied from the FC system 100 to the battery system 40.

The battery system 40 includes, for example, a battery 42, a battery sensor 44, and a heater 46.

The battery 42 is, for example, a secondary battery such as a lithium ion battery or the like. The battery 42 stores, for example, an electric power generated in the motor 12 or the FC system 100, and performs discharge for traveling of the electric vehicle 10

The battery sensor 44 includes, for example, a current sensor, a voltage sensor and a temperature sensor. The battery sensor 44 detects, for example, a current value, a voltage value and a temperature of the battery 42. The battery sensor 44 outputs the detected current value, voltage value, temperature, and the like, to the control device 50. A temperature sensor of the battery sensor 44 is an example of "a temperature detection part."

The heater 46 is provided at a position where heat is transferred to the battery 42, and heats the battery 42 using an electric power stored in the battery 42. The heater 46 heats the battery 42, for example, when a temperature of the battery 42 detected by the battery sensor 44 is less than a predetermined temperature. The heater 46 is an example of "a heating part."

The FC system 100 includes a fuel cell. The fuel cell generates power by reacting hydrogen contained in a fuel gas as a fuel with oxygen contained in air as oxidizer. The FC system 100 outputs the generated electric power to, for example, a DC link between the converter 32 and the BTVCU 34. Accordingly, the electric power supplied by the FC system 100 is supplied to the motor 12 via the converter 32, supplied to the battery system 40 via the BTVCU 34, or stored in the battery 42.

The control device 50 includes, for example, a motor control part 52, a brake control part 54, an electric power control part 56 and an SOC calculating part 58. The motor control part 52, the brake control part 54, the electric power control part 56, and the SOC calculating part 58 may be substituted with separate control devices, for example, control devices that are referred to as a motor ECU, a brake ECU and a battery ECU.

The motor control part 52 calculates a driving force required for the motor 12 on the basis of the output of the vehicle sensor 20, and controls the motor 12 such that the calculated driving force is output.

The brake control part 54 calculates a braking force required by the brake device 16 on the basis of the output of the vehicle sensor 20, and controls the brake device 16 to output the calculated braking force.

The electric power control part 56 calculates a total demand electric power required for the battery system 40 and the FC system 100 on the basis of the output of the vehicle sensor 20. For example, the electric power control part 56 calculates a torque to be output by the motor 12 on the basis of the accelerator opening degree and the vehicle speed, and calculates a driving shaft demand electric power obtained from the torque and a rotational speed of the motor 12, and a total demand electric power by summing the electric power required by auxiliary machinery and the like.

The SOC calculating part 58 calculates a state of charge (SOC) of the battery 42 (hereinafter, also referred to as "a battery charged rate") on the basis of the output of the battery sensor 44. The SOC calculating part 58 is an example of "the charged rate detection part."

The electric power control part 56 calculates a charge/discharge demand electric power of the battery 42 from the SOC of the battery 42. Then, the electric power control part 56 subtracts the charge/discharge demand electric power of the battery 42 from the total demand electric power (a discharge side is assumed as positive), calculates a FC demand electric power required by the FC system 100, and generates the electric power corresponding to the calculated FC demand electric power to the FC system 100.

The display device 60 includes, for example, a display part 62 and a display control part 64. The display part 62 displays information according to the control of the display control part 64. The display control part 64 displays an image on the display part 62 based on the information output from the battery system 40. In addition, the display control part 64 displays the image on the display part 62 based on the information output from the control device 50. In addition, the display control part 64 displays an image showing a vehicle speed or the like output from the vehicle sensor 20 on the display part 62.

The charging port 70 is directed toward a side outward from a vehicle body of the electric vehicle 10. The charging port 70 is connected to a charge/discharge device 200 via a charging cable 220. The charging cable 220 includes a first plug 222 and a second plug 224. The first plug 222 is connected to the charge/discharge device 200, and the second plug 224 is connected to the charging port 70. The electric power supplied from the charge/discharge device 200 is supplied to the charging port 70 via the charging cable 220.

The charging cable 220 includes a signal cable attached to an electric power cable. The signal cable mediates communication between the electric vehicle 10 and the charge/discharge device 200. Accordingly, an electric power connector and a signal connector are provided on the first plug 222 and the second plug 224.

The converter 72 is provided between the charging port 70 and the battery system 40. The converter 72 converts the current introduced from the charge/discharge device 200 via the charging port 70, for example, alternating current into direct current. The converter 72 outputs the converted direct current to the battery system 40.

<FC System 100>

Figure 2:
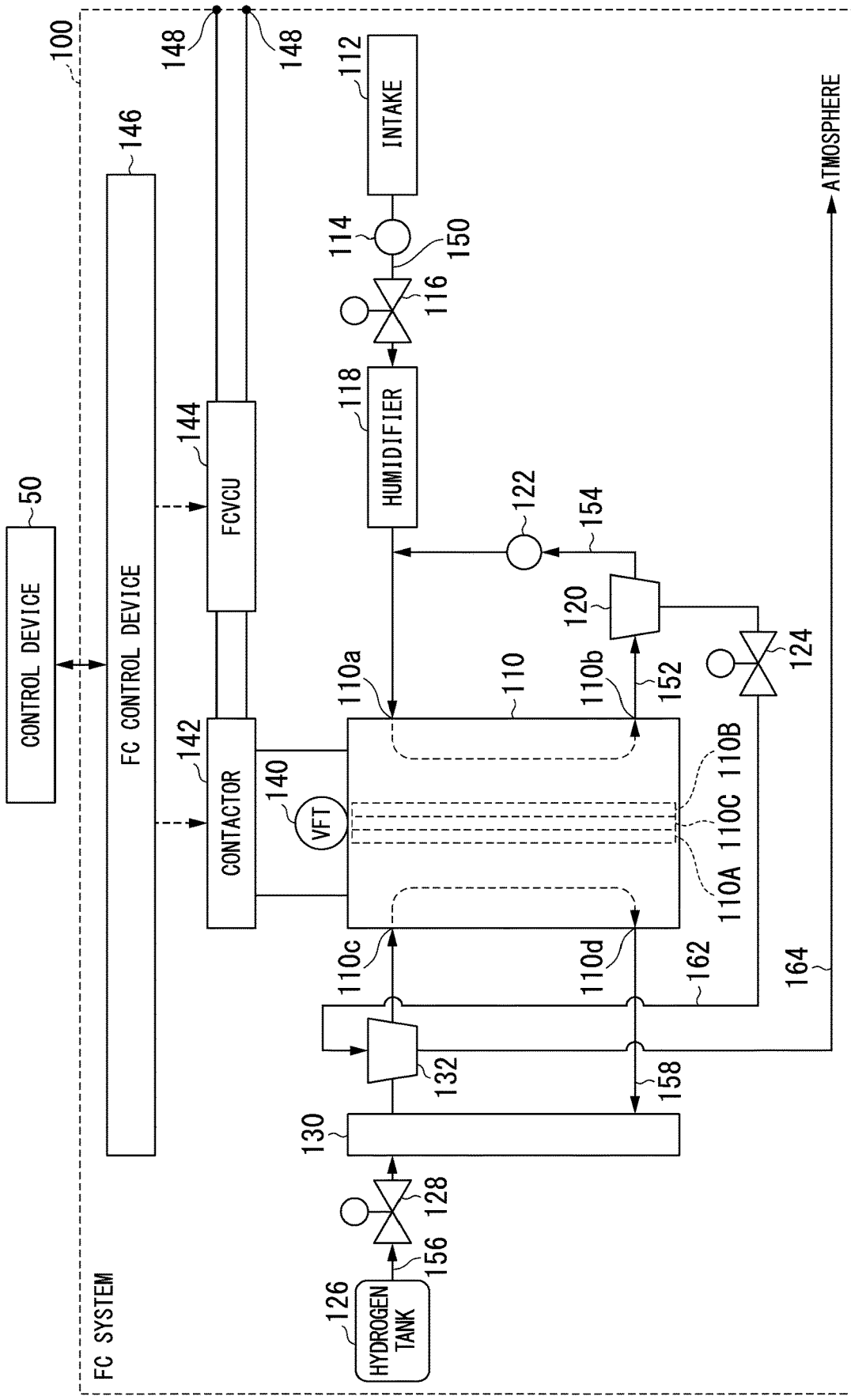
FIG. 2 is a view showing an example of a configuration of an FC system according to the embodiment.

FIG. 2 is a view showing an example of a configuration of the FC system 100 according to the embodiment.

As shown in FIG. 2, the FC system 100 includes, for example, an FC stack 110, an intake 112, an air pump 114, a sealing inlet valve 116, a humidifier 118, a gas-liquid separator 120, an exhaust recirculation pump 122, a drain valve 124, a hydrogen tank 126, a hydrogen supply valve 128, a hydrogen circulating part 130, a gas-liquid separator 132, a temperature sensor 140, a contactor 142, a fuel cell voltage control unit (FCVCU) 144, and a FC control device 146.

The FC stack 110 includes a fuel cell stack (not shown) in which a plurality of fuel cells are stacked, and a pair of end plates (not shown) configured to sandwich the fuel cell stack from both sides in a stacking direction.

The fuel cell includes a membrane electrode assembly (MEA), and a pair of separators that sandwich the membrane electrode assembly from both sides in a joining direction.

The membrane electrode assembly includes an anode 110A constituted by an anode catalyst and a gas diffusion layer, an cathode 110B constituted by a cathode catalyst and a gas diffusion layer, and a solid polymer electrolyte membrane 110C constituted by a cation-exchange membrane or the like sandwiched between the anode 110A and the cathode 110B from both sides in a thickness direction.

A fuel gas that contains hydrogen as a fuel is supplied to the anode 110A from the hydrogen tank 126, and air that is an oxidant gas (reactant gas) containing oxygen as an oxidizer is supplied to the cathode 110B from the air pump 114.

The hydrogen supplied to the anode 110A is ionized by a catalyst reaction on the anode catalyst, and hydrogen ions are moved to the cathode 110B via the solid polymer electrolyte membrane 110C that is appropriately humidified. Electrons generated according to movement of the hydrogen ions can be taken out to the external circuit (the FCVCU 144 or the like) as the direct current.

The hydrogen ions moved onto the cathode catalyst of the cathode 110B from the anode 110A react with the oxygen supplied to the cathode 110B and the electrons on the cathode catalyst to generate water.

The air pump 114 includes a motor or the like driven and controlled by the FC control device 146, takes and compresses air from the outside via the intake 112 using the driving force of the motor, and sends the air after compression to an oxidant gas supply path 150 connected to the cathode 110B.

The sealing inlet valve 116 is provided in the oxidant gas supply path 150 that connects the air pump 114 and a cathode supply port 110a configured to supply air to the cathode 110B of the FC stack 110, and is opened and closed by control of the FC control device 146.

The humidifier 118 humidifies the air sent to the oxidant gas supply path 150 from the air pump 114. More specifically, the humidifier 118 includes a water-permeable membrane such as a hollow fiber membrane or the like, and adds moisture to the air by bringing the air from the air pump 114 into contact with the moisture via the water-permeable membrane.

The gas-liquid separator 120 separates a cathode exhaust gas and liquid water discharged to an oxidant gas discharge path 152 without them being consumed by the cathode 110B. The cathode exhaust gas separated from the liquid water by the gas-liquid separator 120 flows into an exhaust gas recirculation path 154.

The exhaust recirculation pump 122 is provided in the exhaust gas recirculation path 154, mixes the cathode exhaust gas flowing to the exhaust gas recirculation path 154 from the gas-liquid separator 120 with the air flowing through the oxidant gas supply path 150 from the sealing inlet valve 116 toward the cathode supply port 110a, and supplies the mixture to the cathode 110B again.

The liquid water separated from the cathode exhaust gas by the gas-liquid separator 120 is discharged to the gas-liquid separator 132 provided in a fuel gas supply path 156 via a connecting path 162. The liquid water discharged to the gas-liquid separator 132 is discharged to the atmosphere via a drain pipe 164.

The hydrogen tank 126 stores hydrogen in a compressed state.

The hydrogen supply valve 128 is provided in the fuel gas supply path 156 that connects the hydrogen tank 126 and an anode supply port 110c configured to supply hydrogen to the anode 110A of the FC stack 110. The hydrogen supply valve 128 supplies the hydrogen stored in the hydrogen tank 126 to the fuel gas supply path 156 when the valve is opened by control of the FC control device 146.

The hydrogen circulating part 130 circulates the anode exhaust gas, which is discharged to a fuel gas discharge path 158 without being consumed at the anode 110A, to the fuel gas supply path 156.

The gas-liquid separator 132 separates the anode exhaust gas and the liquid water that circulate from the fuel gas discharge path 158 to the fuel gas supply path 156 by a function of the hydrogen circulating part 130. The gas-liquid separator 132 supplies the anode exhaust gas separated from the liquid water to the anode supply port 110c of the FC stack 110.

The temperature sensor 140 detects temperatures of the anode 110A and the cathode 110B of the FC stack 110, and outputs the detection signal to the FC control device 146.

The contactor 142 is provided between the anode 110A and the cathode 110B of the FC stack 110 and the FCVCU 144. The contactor 142 electrically connects or disconnects between the FC stack 110 and the FCVCU 144 on the basis of the control from the FC control device 146.

The FCVCU 144 is, for example, a boosting type DC-DC converter. The FCVCU 144 is disposed between the anode 110A and the cathode 110B of the FC stack 110 and an electric load via the contactor 142. The FCVCU 144 boosts a voltage of an output terminal 148 connected to the side of the electric load to a target voltage determined by the FC control device 146. For example, the FCVCU 144 boosts the voltage output from the FC stack 110 to the target voltage and outputs the boosted voltage to the output terminal 148.

The FC control device 146 performs warming-up control of the FC system 100 when it is determined by the electric power control part 56 that warming-up of the FC system 100 is necessary and the FC demand electric power required by the FC system 100 is a predetermined value or more. For example, the electric power control part 56 acquires a detection signal by the temperature sensor 140 from the FC control device 146, and determines that the warming-up of the FC system 100 is necessary when the temperature of the FC stack 110 detected by the temperature sensor 140 is less than a threshold. In addition, the electric power control part 56 acquires the detection signal by the temperature sensor 140 from the FC control device 146 while the warming-up control of the FC system 100 is performed, and determines that the warming-up control of the FC system 100 is be terminated when the temperature of the FC stack 110 detected by the temperature sensor 140 is the threshold or more.

[Warming-Up Control of FC System]

The FC system 100 first opens the drain valve 124 when the warming-up control is performed. Next, the FC system 100 opens the sealing inlet valve 116 and the hydrogen supply valve 128, and supplies the hydrogen gas to the anode 110A of the FC stack 110 from the hydrogen tank 126 via the fuel gas supply path 156 while supplying the oxidant gas to the cathode 110B of the FC stack 110 from the intake 112 via the oxidant gas supply path 150. Accordingly, power generation of the FC stack 110 is performed.

In this case, since the drain valve 124 is open, after the gas is taken to the oxidant gas supply path 150 through the intake 112, the non-reacted oxidant gas discharged from the cathode 110B is supplied to the gas-liquid separator 132 from the gas-liquid separator 120 via the connecting path 162. Then, the oxidant gas separated from the liquid water by the gas-liquid separator 132 is supplied to the anode 110A of the FC stack 110 together with the hydrogen gas supplied from the hydrogen tank 126. As a result, an exothermic reaction (catalyst combustion) is generated on the anode 110A of the FC stack 110 by the oxidant gas and the fuel gas. According to the exothermic reaction, the FC stack 110 is rapidly heated.

After that, the FC system 100 closes the drain valve 124 when it is determined that the warming-up control of the FC system 100 is terminated by the electric power control part 56. Accordingly, the oxidant gas is not supplied to the anode 110A of the FC stack 110, and the exothermic reaction on the anode 110A of the FC stack 110 is stopped.

The electric power control part 56 switches the control of the electric power according to correspondence shown in FIG. 3 when it is determined that the warming-up of the FC system 100 is necessary and the FC demand electric power required by the FC system 100 is equal to or greater than the predetermined value. The control of the electric power is, for example, temporary control performed upon starting of the electric vehicle 10. The electric power control part 56 performs simple control by case classification according to correspondence shown in FIG. 3 in the temporary control upon starting of the electric vehicle 10. Further, as a premise, the electric power control part 56 classifies a temperature of the battery 42 as "high" when the temperature of battery 42 is equal to or greater than the predetermined temperature and classifies a temperature of the battery 42 as "low" when the temperature is the battery 42 is less than the predetermined temperature. In addition, the electric power control part 56 classifies the SOC of the battery 42 as "high" when the SOC of the battery 42 is equal to or greater than a predetermined proportion, and classifies the SOC of the battery 42 as "low" when the SOC of the battery 42 is less than the predetermined proportion. Further, the electric power control part 56 may classify the temperature of the battery 42 and the SOC of the battery 42 as a plurality of steps, in addition to the two steps. In addition, the electric power control part 56 may determine handling of the temperature or the SOC of the battery 42 using the temperature of the battery 42 and the SOC of the battery 42 as continuous value, for example, by inputting the parameters to a function and calculating them, in addition to classifying them as discrete values.

In the embodiment, the electric power control part 56 performs "Control 1" when the temperature of the battery 42 is classified as "low" and the SOC of the battery 42 is classified as "high." "Control 1" is instructing the FC system 100 and the battery system 40 to generate power in the FC system 100 to FC demand electric power required by the FC system 100 and to operate the heater 46 by supplying the electric power stored in the battery 42 to the heater 46. In this case, the electric power control part 56 instructs the BTVCU 34 to cutoff supply of the electric power from the FC system 100 to the battery system 40.

The electric power control part 56 performs "Control 2" when the temperature of the battery 42 is classified as "high" and the SOC of the battery 42 is classified as "high." "Control 2" is instructing the FC system 100, the BTVCU 34, and the battery system 40 to cause the FC system 100 to generate the FC demand electric power required by the FC system 100 and not to operate the heater 46.

The electric power control part 56 performs "Control 3" when the temperature of the battery 42 is classified as "high" and the SOC of the battery 42 is classified as "low." "Control 3" is instructing the FC system 100, the BTVCU 34, and the battery system 40 to cause the FC system 100 to generate an electric power that is greater than the FC demand electric power required by the FC system 100, store excess electric power in the battery 42 and not to operate the heater 46. As a result, the electric power stored in the battery 42 including the excess electric power is not supplied to the heater 46.

The electric power control part 56 performs "Control 4" when the temperature of the battery 42 is classified as "low" and the SOC of the battery 42 is classified as "low." "Control 4" is instructing the FC system 100, the BTVCU 34, and the battery system 40 to cause the FC system 100 to generate an electric power that is greater than the FC demand electric power required by the FC system 100, storing excess electric power in the battery 42 and supplying the electric power stored in the battery 42 to the heater 46 to operate the heater 46. As a result, the electric power stored in the battery 42 including the excess electric power is supplied to the heater 46.

[Processing Flow of Fuel Cell System]

Figure 4:
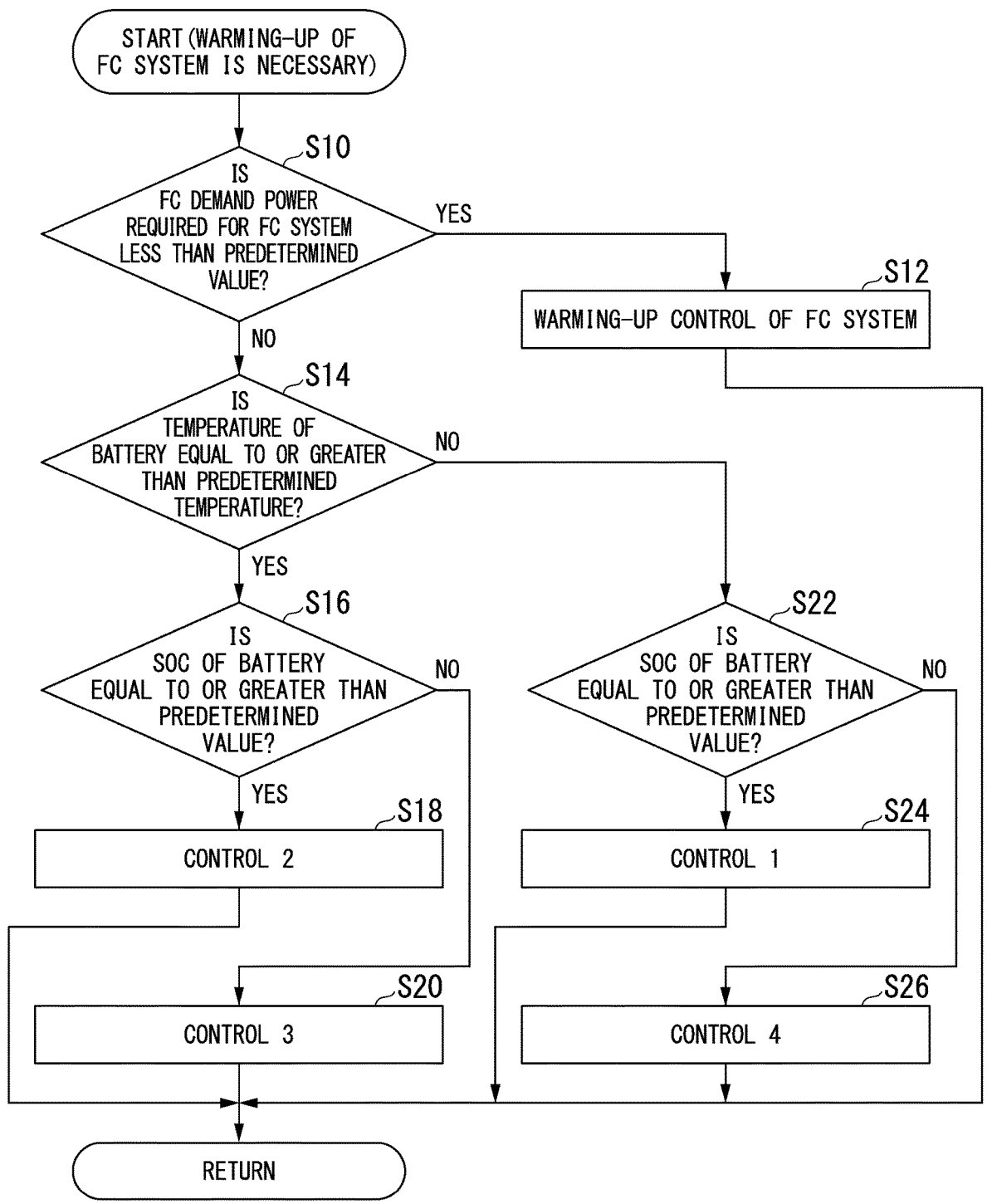
FIG. 4 is a flowchart showing an example of a flow of a series of processing in a control device according to the embodiment.

Hereinafter, a flow of a series of processing in a control computer of the fuel cell system according to the embodiment will be described with reference to a flowchart. The processing of the flowchart shown in FIG. 4 may be executed, for example, when the electric power control part 56 determines that the warming-up of the FC system 100 is required.

First, the electric power control part 56 determines whether the FC demand electric power required by the FC system 100 is less than the predetermined value (step S10). The electric power control part 56 performs warming-up control of the FC system 100 when it is determined that the FC demand electric power required by the FC system 100 is less than the predetermined value (step S12). Accordingly, the processing of the flowchart is terminated.

The electric power control part 56 determines whether the temperature of the battery 42 is equal to or greater than the predetermined temperature when it is determined that the FC demand electric power required by the FC system 100 is equal to or greater than the predetermined value (step S14). The electric power control part 56 determines whether the SOC of the battery 42 is equal to or greater than the predetermined value when it is determined that the temperature of the battery 42 is equal to or greater than the predetermined temperature (step S16). The electric power control part 56 performs "Control 2" when it is determined that the SOC of the battery 42 is equal to or greater than the predetermined value (step S18). Accordingly, the processing of the flowchart is terminated. The electric power control part 56 performs "Control 3" when it is determined that the SOC of the battery 42 is less than the predetermined value (step S20). Accordingly, processing of the flowchart is terminated.

The electric power control part 56 determines whether the SOC of the battery 42 is equal to or greater than the predetermined value when it is determined that the temperature of the battery 42 is less than the predetermined temperature (step S22). The electric power control part 56 performs "Control 1" when it is determined that the SOC of the battery 42 is equal to or greater than the predetermined value (step S24). Accordingly, processing of the flowchart is terminated. Meanwhile, the electric power control part 56 performs "Control 4" when it is determined that the SOC of the battery 42 is less than the predetermined value (step S26). Accordingly, processing of the flowchart is terminated.

[Timing Chart of Control]

Hereinafter, scenes in which "Control 1" to "Control 4" are executed will be described with reference to the drawings.

Figure 5:
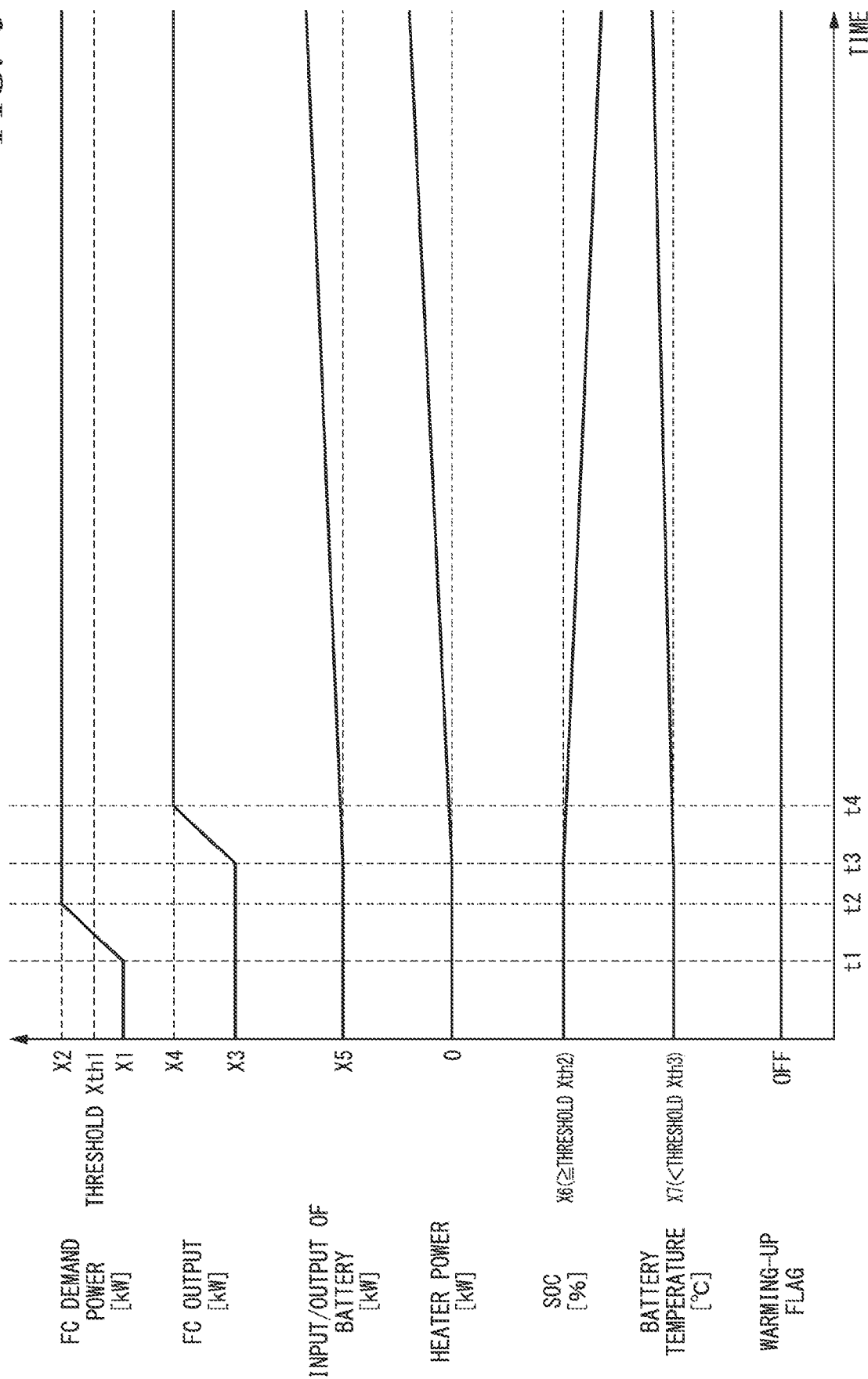
FIG. 5 is a timing chart showing an example of a state quantity or the like in a scene in which Control 1 is executed.

First, a scene in which "Control 1" is executed will be described with reference to a timing chart shown in FIG. 5. In this case, an initial value X6 of the SOC of the battery 42 is equal to or greater than a threshold Xth2 used for switching of the control of the electric power by the electric power control part 56. In addition, an initial value X7 of the temperature of the battery 42 is smaller than a threshold Xth3 used for switching of the control of the electric power by the electric power control part 56. In addition, a warming-up flag is maintained off, and warming-up control of the FC system 100 is not performed.

The FC demand electric power required by the FC system 100 is increased from electric power X1 at a time t1. Then, at a time t2, after the FC demand electric power required for the FC system 100 reaches electric power X2, in the example of FIG. 5 in which the FC demand electric power required for the FC system 100 is maintained at the electric power X2, the electric power X2 is greater than a threshold Xth1 used for switching of the electric power control by the electric power control part 56.

Next, at a time t3, when the warming-up of the FC system 100 is required, the FC electric power output from the FC system 100 is increased from electric power X3. Then, at a time t4, after the FC electric power output from the FC system 100 reaches electric power X4, the FC electric power output from the FC system 100 is maintained at the electric power X4. In this case, the electric power X4 output from the FC system 100 as the FC electric power is controlled to coincide with the electric power X2 required for the FC system 100.

In addition, at a time t3, the electric power output from the battery 42 is increased from electric power X5 (for example, 0 kW), and heater electric power supplied from the battery 42 to the heater 46 is increased. In addition, according to an increase in electric power output from the battery 42, the SOC of the battery 42 is reduced from the initial value X6. In addition, at a time t3, according to an increase in electric power supplied from the battery 42 to the heater 46, a heating quantity of the battery 42 by the heater 46 is increased, and a temperature of the battery 42 is increased from the initial value X7.

Figure 6:
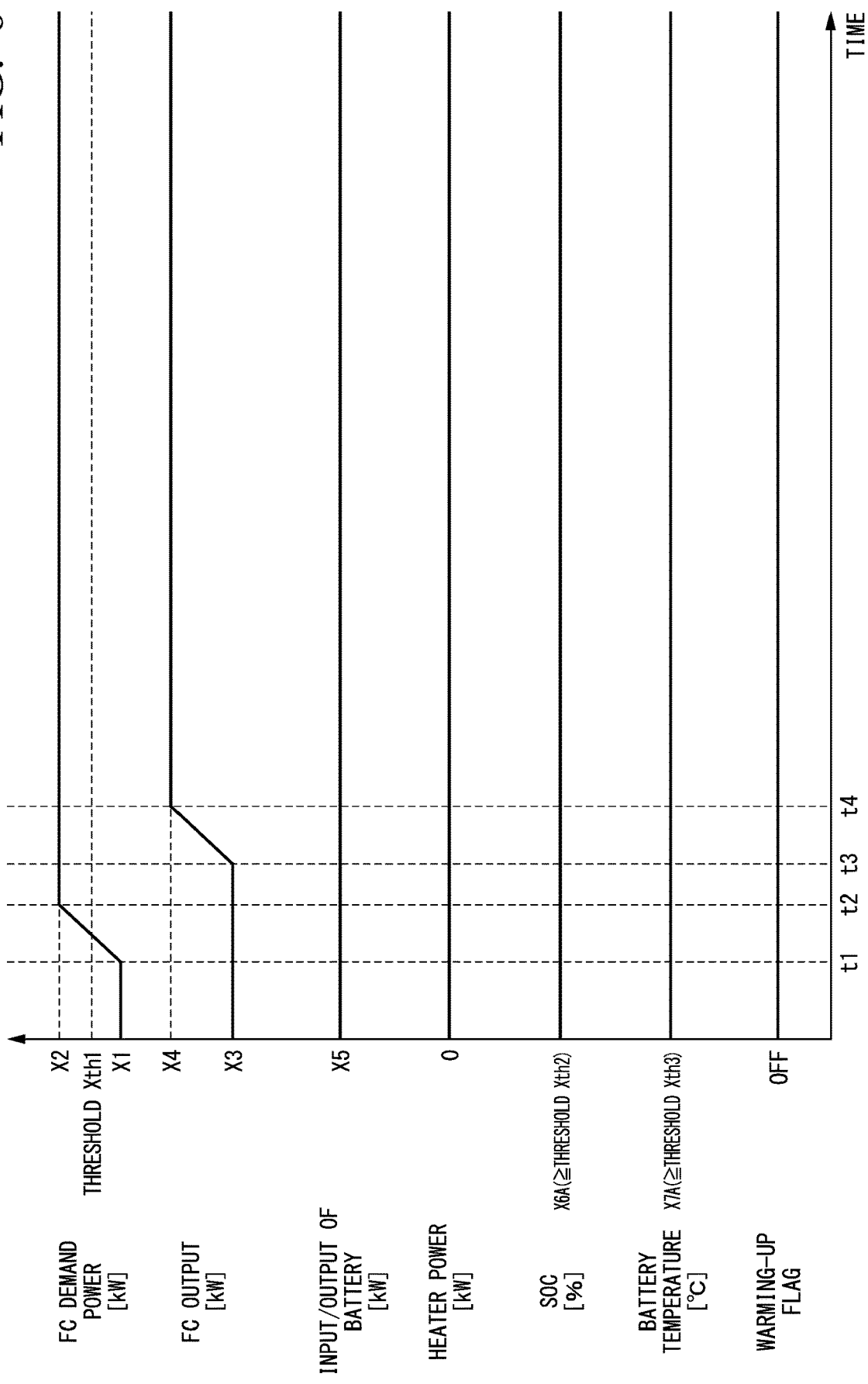
FIG. 6 is a timing chart showing an example of a state quantity or the like in a scene in which Control 2 is executed.

Next, a scene in which "Control 2" is executed will be described with reference to a timing chart shown in FIG. 6. In this case, the initial value X6A of the SOC of the battery 42 is equal to or greater than the threshold Xth2 used for switching of the electric power control by the electric power control part 56. In addition, the initial value X7A of the temperature of the battery 42 is equal to or greater than the threshold Xth3 used for switching of the electric power control by the electric power control part 56. In addition, a warming-up flag is maintained off, and the warming-up control of the FC system 100 is not performed.

At the time t1, the FC demand electric power required for the FC system 100 is increased from the electric power X1. Then, at the time t2, after the FC demand electric power required for the FC system 100 reaches the electric power X2, the FC demand electric power required for the FC system 100 is maintained at the electric power X2. In the example of FIG. 6, the electric power X2 is greater than the threshold Xth1 used for switching of the electric power control by the electric power control part 56.

Next, at the time t3, when the warming-up of the FC system 100 is necessary, the FC electric power output from the FC system 100 is increased from the electric power X3. Then, at the time t4, after the FC electric power output from the FC system 100 reaches the electric power X4, the FC electric power output from the FC system 100 is maintained at the electric power X4. In this case, the electric power X4 output from the FC system 100 as the FC electric power is controlled to coincide with the electric power X2 required for the FC system 100 as the generated output.

In this case, at the time t3, the electric power output from the battery 42 is maintained at the electric power X5 (for example, 0 kW), and the electric power supplied from the battery 42 to the heater 46 is also maintained at 0 kW. In addition, the SOC of the battery 42 is maintained at the initial value X6, and the temperature of the battery 42 is maintained at the initial value X7.

Figure 7:
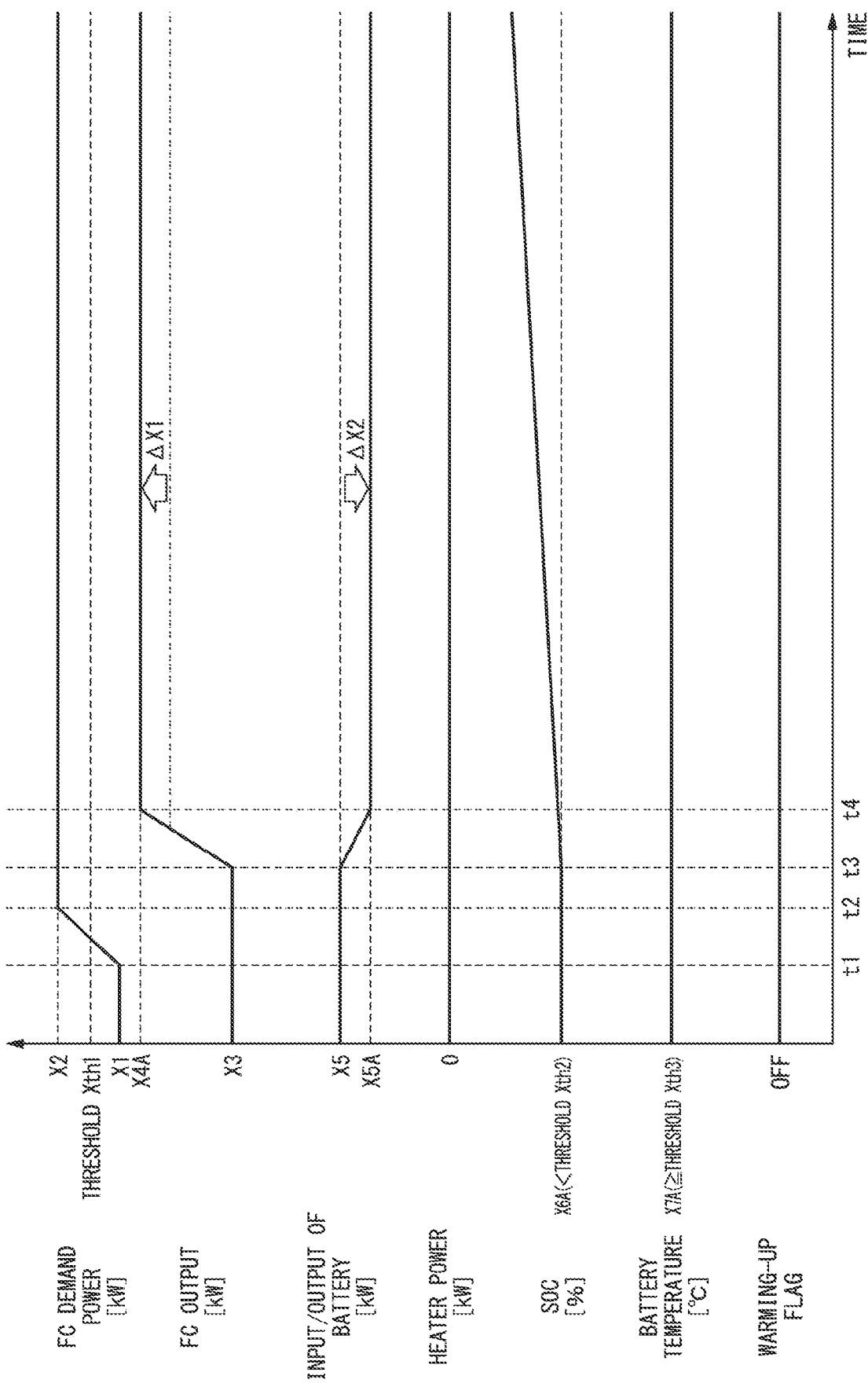
FIG. 7 is a timing chart showing an example of a state quantity or the like in a scene in which Control 3 is executed.

Next, a scene in which "Control 3" is executed will be described with reference to a timing chart shown in FIG. 7. In this case, the initial value X6A of the SOC of the battery 42 is less than the threshold Xth2 used for switching of the electric power control by the electric power control part 56. In addition, the initial value X7A of the temperature of the battery 42 is equal to or greater than the threshold Xth3 used for switching of the electric power control by the electric power control part 56. In addition, the warming-up flag is maintained off, and the warming-up control of the FC system 100 is not performed.

At the time t1, the FC demand electric power required for the FC system 100 is increased from the electric power X1. Then, at the time t2, after the FC demand electric power required for the FC system 100 reaches the electric power X2, the FC demand electric power required for the FC system 100 is maintained at the electric power X2. In the example of FIG. 7, the electric power X2 is greater than the threshold Xth1 for switching of the electric power control by the electric power control part 56.

Next, at the time t3, when the warming-up of the FC system 100 is necessary, the FC electric power output from the FC system 100 is increased from the electric power X3. Then, at the time t4, after the FC electric power output from the FC system 100 reaches the electric power X4A, the FC electric power output from the FC system 100 is maintained at the electric power X4A. In this case, the electric power X4A output from the FC system 100 as the FC electric power is greater than the electric power X2 required for the FC system 100. A difference ΔX1 between the electric power X4A output from the FC system 100 as the FC electric power and the electric power X2 required for the FC system 100 corresponds to excess electric power.

In addition, at the time t3, according to an increase in FC electric power output from the FC system 100, the electric power output from the battery 42 is reduced from the electric power X5 (for example, 0 kW) to the electric power X5A. That is, it means that the battery 42 is charged with the electric power X5A. In this case, the difference ΔX1 between the electric power X5 and the electric power X5A is controlled to coincide with a difference ΔX2 corresponding to the excess electric power.

In this case, at the time t3, even when the electric power output from the battery 42 is reduced, the electric power supplied from the battery 42 to the heater 46 is maintained at 0 kW, and the temperature of the battery 42 is maintained at the initial value X6. Meanwhile, according to an increase in electric power charged in the battery 42, the SOC of the battery 42 is increased from the initial value X6.

Next, a scene in which "Control 4" is executed will be described with reference to a timing chart shown in FIG. 8. In this case, the initial value X6A of the SOC of the battery 42 is less than the threshold Xth2 used for switching of the electric power control by the electric power control part 56. In addition, the initial value X7A of the temperature of the battery 42 is less than that of the threshold Xth3 used for switching of the electric power control by the electric power control part 56. In addition, the warming-up flag is maintained off and the warming-up control of the FC system 100 is not performed.

At the time t1, the FC demand electric power required for the FC system 100 is increased from the electric power X1. Then, at the time t2, after the FC demand electric power required for the FC system 100 reaches the electric power X2, the FC demand electric power required for the FC system 100 is maintained at the electric power X2. In the example shown in FIG. 8, the electric power X2 is greater than the threshold Xth1 used for switching of the electric power control by the electric power control part 56.

Next, at the time t3, when the warming-up of the FC system 100 is necessary, the FC electric power output from the FC system 100 is increased from the electric power X3 to the electric power X4A. In this case, the electric power X4A output from the FC system 100 as the FC electric power is controlled to be greater than the electric power X2 required for the FC system 100. A difference ΔX3 between the electric power X4A output from the FC system 100 as the FC electric power and the electric power X2 required for the FC system 100 corresponds to the excess electric power. Then, according to an increase in FC electric power output from the FC system 100, the electric power supplied from the battery 42 to the heater 46 is increased from 0 kW and the temperature of the battery 42 is also increased from the initial value X7.

Next, at the time t4, after the electric power supplied from the battery 42 to the heater 46 reaches X8, the electric power supplied from the battery 42 to the heater 46 is maintained at X8.

Then, at a time t5, when the temperature of the battery 42 reaches X7B, the electric power supplied from the battery 42 to the heater 46 is reduced from X8 to 0 kW. In this case, at the time t5, the electric power output from the battery 42 is reduced, and the battery 42 is charged by a difference ΔX4 between the electric power X5 and the electric power X5B. Then, according to an increase in electric power charged in the battery 42, the SOC of the battery 42 is increased from the initial value X6. That is, the battery 42 is charged with the excess electric power generated in the FC system 100.

As described above, according to the fuel cell system of the embodiment, energy efficiency when the warming-up of the FC system 100 is performed can be increased. For example, when the warming-up of the FC system 100 is necessary, upon power generation of the FC system 100, in the case in which heat of reaction generated due to reaction between hydrogen contained in a fuel gas as fuel and oxygen contained in air as oxidant is sufficiently large, the warming-up control of the FC system 100 may be unnecessary by heating the FC system 100 using the heat of reaction. Accordingly, according to the fuel cell system of the embodiment, the electric power control part 56 performs the warming-up control of the FC system 100 when the warming-up of the FC system 100 is necessary and the FC demand electric power required for the FC system 100 is less than the predetermined value, causes the FC system 100 to generate the electric power greater than the FC demand electric power required for the FC system 100 when the warming-up of the FC system 100 is necessary and the FC demand electric power required for the FC system 100 is equal to or greater than the predetermined value, and stores the excess electric power in the battery 42. Accordingly, energy efficiency when the warming-up of the FC system 100 is performed can be increased.

In addition, according to the fuel cell system of the embodiment, a decrease in cruising distance of the electric vehicle 10 under a low temperature environment can be minimized. For example, when the temperature of the battery 42 is less than the predetermined temperature, the charging capacity of the battery 42 may be decreased and the cruising distance of the electric vehicle 10 may be reduced. Accordingly, according to the fuel cell system of the embodiment, the electric power control part 56 causes the FC system 100 to generate the FC demand electric power required for the FC system 100 and supplies the electric power stored in the battery 42 to the heater 46 to heat the battery 42 when the temperature of the battery 42 is less than the predetermined temperature and the SOC of the battery 42 is equal to or greater than the predetermined proportion. Accordingly, the cruising distance of the electric vehicle 10 even under the low temperature environment can be increased.

In addition, according to the fuel cell system of the embodiment, a decrease in cruising distance of the electric vehicle 10 can be further minimized. Accordingly, when the electric power is supplied from the battery 42 to the heater 46 even though heating of the battery 42 is unnecessary, the SOC of the battery 42 may be wasted and the cruising distance of the electric vehicle 10 may be reduced. Accordingly, according to the fuel cell system of the embodiment, the electric power control part 56 causes the FC system 100 to generate the FC demand electric power required for the FC system 100 and does not supply the electric power stored in the battery 42 to the heater 46 when the temperature of the battery 42 is equal to or greater than the predetermined temperature and the SOC of the battery 42 is equal to or greater than the predetermined proportion. Accordingly, the cruising distance of the electric vehicle 10 can be further increased.

In addition, according to the fuel cell system of the embodiment, the cruising distance of the electric vehicle 10 can be secured. For example, even though the SOC of the battery 42 is decreased and the electric power generated in the FC system 100 is supplied to the battery 42, when the electric power is supplied from the battery 42 to the heater 46 to heat the battery 42, the cruising distance of the electric vehicle 10 may not be secured. Accordingly, according to the fuel cell system of the embodiment, the electric power control part 56 causes the FC system 100 to generate the electric power that is greater than the FC demand electric power required for the FC system 100, stores the excess electric power in the battery 42, and does not supply the electric power stored in the battery 42 including the excess electric power to the heater 46 when the temperature of the battery 42 is equal to or greater than the predetermined temperature and the SOC of the battery 42 is less than the predetermined proportion. Accordingly, the cruising distance of the electric vehicle 10 can be secured.

In addition, according to the fuel cell system of the embodiment, the cruising distance of the electric vehicle 10 under the low temperature environment can be secured. For example, according to a decrease in temperature of the battery 42, when the charging capacity of the battery 42 is decreased, even though the electric power that is greater than the generated output required for the FC system 100 is generated in the FC system 100 and the electric power generated by the FC system 100 is stored in the battery 42, the cruising distance of the electric vehicle 10 may not be secured. Accordingly, according to the fuel cell system of the embodiment, the electric power control part 56 heats the battery 42 by causing the FC system 100 to generate the electric power that is greater than the FC demand electric power required for the FC system 100, store the excess electric power in the battery 42 and supply the electric power stored in the battery 42 including the excess electric power to the heater 46 when the temperature of the battery 42 is less than the predetermined temperature and the SOC of the battery 42 is less than the predetermined proportion. Accordingly, the cruising distance of the electric vehicle 10 under the low temperature environment can be secured.

<Variant of Embodiment>

In the embodiment, the electric power control part 56 may determine that the warming-up of the FC stack 110 is necessary, for example, when the temperature of the FC stack 110 is equal to or greater than a threshold for a predetermined period or more or when the number of times when the temperature of the FC stack 110 is increased is equal to or greater than the threshold is equal to or greater than a predetermined number of times.

In the embodiment, the electric power control part 56 may decrease a degree of the warming-up control of the FC system 100 when the FC demand electric power required for the FC system 100 is equal to or greater than the predetermined value in comparison with the case in which the FC demand electric power required for the FC system 100 is smaller than the predetermined value. The electric power control part 56 may decrease a degree of the warming-up control of the FC system 100 by reducing a flow rate of a fuel gas discharged to the gas-liquid separator 132 from the gas-liquid separator 120 via the connecting path 162, for example, when the warming-up control of the FC system 100 is performed.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A system comprising:
a fuel cell configured to generate an electric power by reacting a fuel of an anode with an oxidant of a cathode;
an electrical storage device configured to store electric power generated by the fuel cell;
an electric load to which the electric power is supplied using at least one of the electric power generated by the fuel cell and the electric power stored in the electrical storage device;
an electric power control part configured to control supply of the electric power from the fuel cell and the electrical storage device to the electric load,
a temperature detector configured to detect a temperature of the electrical storage device;
a charged rate detector configured to detect a charged rate of the electrical storage device; and
a heater provided at a position where heat is transferred to the electrical storage device and configured to generate heat using an electric power,
wherein, when warming-up of the fuel cell is necessary, the electric power control part performs,
warming-up control of the fuel cell when an electric power requested to be generated at the fuel cell is less than a predetermined value, and
when the electric power requested to be generated at the fuel cell is greater than the predetermined value, a temperature of the electrical storage device detected by the temperature detector is less than a predetermined temperature, and a charged rate detected by the charged rate detector is less than a predetermined proportion, the electric power control part causes the fuel cell to generate an electric power that is greater than the electric power requested to be generated at the fuel cell and causes to store excess electric power in the electrical storage device, causes to perform heating at the heater by supplying an electric power stored in the electrical storage device, in which the excess electric power has been stored, to the heater until the electrical storage device reaches a predetermined temperature and causes to stop the supplying the electric power stored in the electrical storage device to the heater and to store the excess electric power generated at the fuel cell in the electrical storage device after the electrical storage device has reached the predetermined temperature.

2. The system according to claim 1, wherein the warming-up control is control of generating an exothermic reaction by supplying the fuel, which is non-reacted, discharged from the anode to the cathode.

3. The system according to claim 1,
wherein the electric power control part causes the fuel cell to generate the electric power requested to be generated at the fuel cell and causes to generate heat by supplying the electric power stored in the electrical storage device to the heater when the electric power requested to be generated at the fuel cell is greater than the predetermined value, the temperature of the electrical storage device detected by the temperature detector less than the predetermined temperature, and the charged rate detected by the charged rate detector is equal to or greater than a predetermined proportion.

4. The system according to claim 1,
wherein the electric power control part causes the fuel cell to generate the electric power requested to be generated at the fuel cell and does not supply the electric power stored in the electrical storage device to the heater when the electric power requested to be generated at the fuel cell is greater than the predetermined value, the temperature of the electrical storage device detected by the temperature detector is equal to or greater than a predetermined temperature, and a charged rate detected by the charged rate detector is equal to or greater than a predetermined proportion.

5. The system according to claim 1,
wherein the electric power control part causes the fuel cell to generate an electric power greater than the electric power requested to be generated at the fuel cell, causes to store excess electric power in the electrical storage device, and does not supply the electric power stored in the electrical storage device including the excess electric power to the heater when the electric power requested to be generated at the fuel cell is greater than the predetermined value, a temperature of the electrical storage device detected by the temperature detector is equal to or greater than a predetermined temperature, and a charged rate detected by the charged rate detector is less than a predetermined proportion.

6. A method of controlling a system, which is performed by a control device of a system comprising:
a fuel cell configured to generate an electric power by reacting fuel of an anode with oxidant of a cathode;
an electrical storage device configured to store the electric power generated by the fuel cell;
an electric load to which an electric power is supplied using at least one of an electric power generated by the fuel cell and an electric power stored in the electrical storage device,
a temperature detector configured to detect a temperature of the electrical storage device;
a charged rate detector configured to detect a charged rate of the electrical storage device; and
a heater provided at a position where heat is transferred to the electrical storage device and configured to generate heat using an electric power,
the method comprising:
controlling supply of an electric power from the fuel cell and the electrical storage device to the electric load;
when warming-up of the fuel cell is necessary,
performing warming-up control required for the fuel cell when an electric power requested to be generated at the fuel cell is less than a predetermined value; and
when the electric power requested to be generated at the fuel cell is greater than the predetermined value, a temperature of the electrical storage device detected by the temperature detector is less than a predetermined temperature, and a charged rate detected by the charged rate detector is less than a predetermined proportion, causing the fuel cell to generate an electric power greater than the electric power requested to be generated at the fuel cell and causing to store excess electric power in the electrical storage device, causing to perform heating at the heater by supplying an electric power stored in the electrical storage device, in which the excess electric power has been stored, to the heater until the electrical storage device reaches a predetermined temperature and causing to stop the supplying the electric power stored in the electrical storage device to the heater and to store the excess electric power generated at the fuel cell in the electrical storage device after the electrical storage device has reached the predetermined temperature.

7. A computer program product, on which a program is stored, wherein the program is executable by a processor of a system, wherein the system comprises:
a fuel cell configured to generate an electric power by reacting fuel of an anode with oxidant of a cathode;
an electrical storage device configured to store the electric power generated by the fuel cell;
an electric load to which an electric power is supplied using at least one of an electric power generated by the fuel cell and an electric power stored in the electrical storage device,
a temperature detector configured to detect a temperature of the electrical storage device;
a charged rate detector configured to detect a charged rate of the electrical storage device; and
a heater provided at a position where heat is transferred to the electrical storage device and configured to generate heat using an electric power,
and wherein execution of the program by the processor causes the processor to perform:
processing of controlling supply of an electric power from the fuel cell and the electrical storage device to the electric load;
when warming-up of the fuel cell is necessary,
processing of performing warming-up control required for the fuel cell when an electric power requested to be generated at the fuel cell is less than a predetermined value; and
when the electric power requested to be generated at the fuel cell is greater than the predetermined value, a temperature of the electrical storage device detected by the temperature detector is less than a predetermined temperature, and a charged rate detected by the charged rate detector is less than a predetermined proportion, processing of causing the fuel cell to generate an electric power greater than the electric power requested to be generated at the fuel cell and storing excess electric power in the electrical storage device, processing of causing to perform heating at the heater by supplying an electric power stored in the electrical storage device, in which the excess electric power has been stored, to the heater until the electrical storage device reaches a predetermined temperature and processing of causing to stop the supplying the electric power stored in the electrical storage device to the heater and to store the excess electric power generated at the fuel cell in the electrical storage device after the electrical storage device has reached the predetermined temperature.

\* \* \* \* \*